Feb. 17, 1959   R. A. WOLF   2,874,261
ELECTRIC HEATING UNIT
Filed Nov. 12, 1957   2 Sheets-Sheet 1

INVENTOR.
ROBERT A. WOLF
BY T. G. Dysart
HIS ATTORNEY

Feb. 17, 1959 R. A. WOLF 2,874,261
ELECTRIC HEATING UNIT
Filed Nov. 12, 1957 2 Sheets-Sheet 2

INVENTOR.
ROBERT A. WOLF
BY
T. G. Dupont
HIS ATTORNEY

# United States Patent Office 2,874,261
Patented Feb. 17, 1959

2,874,261

ELECTRIC HEATING UNIT

Robert A. Wolf, Louisville, Ky., assignor to General Electric Company, a corporation of New York Application November 12, 1957, Serial No. 695,761

3 Claims. (Cl. 219—37)

This invention relates to electric heating units, and more particularly to an electric surface cooking unit of the type having a sheathed heating element coiled in flat spiral configuration so as to form a horizontally disposed cooking utensil support.

A principal object of this invention is to provide a surface cooking unit having sufficient flexibility to conform to cooking utensil bottoms of various shapes as well as those which are completely flat.

Further objects and advantages of the invention will become apparent as the following description proceeds, and the features of novelty which characterize the invention will be pointed out with particularity in the claims annexed to and forming a part of this specification.

Briefly stated, in accordance with one aspect of my invention I provide a horizontally disposed cooking unit having a convoluted sheathed heating element and a support therefor including a plurality of rocker members mounted for pivotal movement about horizontal axes, these parts being so arranged that an intermediate convolution of the heating element is held stationary while the adjacent outer and inner convolutions rest on the rocker members and are free to move upwardly and downwardly to a limited extent. Thus the heating element forms a firm but resilient support for cooking utensils, and is capable of conforming to bottom surfaces of generally convex and concave configurations.

For a better understanding of my invention, reference may be made to the following description and the accompanying drawing in which.

Figure 1:
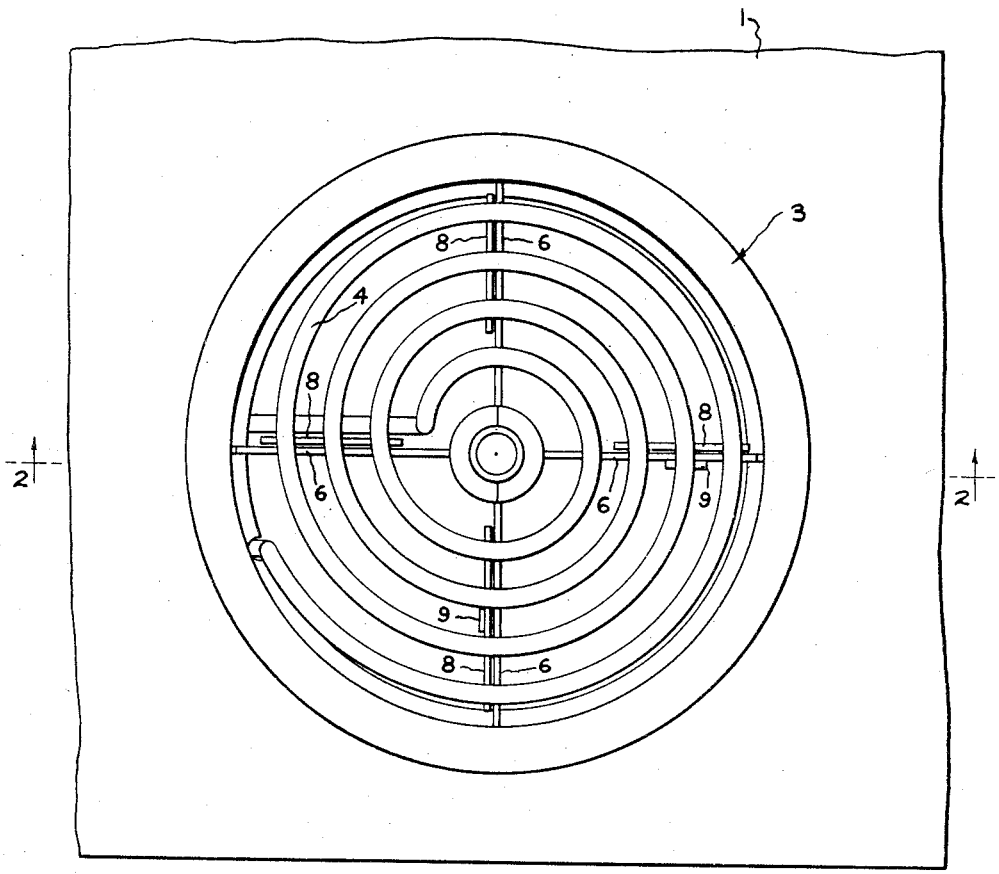
Fig. 1 is a top plan view of a surface cooking unit embodying my invention.
Figure 2:
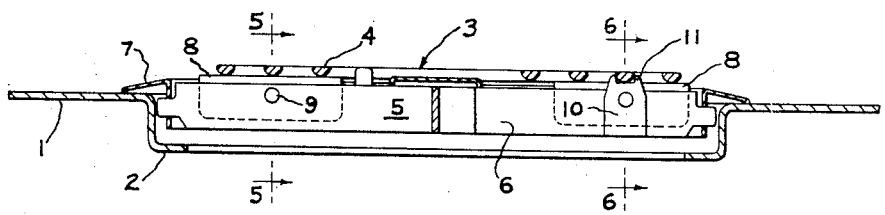
Fig. 2 is a sectional view taken along the line 2—2 in Fig. 1.

Referring to Figs. 1 and 2 of the drawing, the numeral 1 designates the top surface of an electric range or the like having a generally circular opening defined by a flange 2, arranged to accommodate an electric surface cooking unit 3 therein. It will of course be understood that heating unit 3 may be mounted in any other suitable housing or cabinet, such as an individual hot plate housing, for example.

Heating unit 3 comprises a sheathed heating element 4 coiled in flat spiral configuration so as to form a horizontally disclosed support for cooking vessels and the like. In the illustrated embodiment, heating element 4 has four complete convolutions which are arranged in radially spaced relationship and supported on a supporting grid 5 adapted to rest on top surface 1. Supporting grid 5 includes a plurality of radially extending arms 6, a mounting ring 7 fixedly secured to the outermost ends of arm 6 and a plurality of rocker members 8 mounted for pivotal movement on arms 6.

As shown in Fig. 1, each radially extending arm 6 of the supporting grid is provided with a rocker member 8 pivotally mounted on a pivot shaft 9 for pivotal movement about a horizontal axis and arranged to support radially spaced portions of at least three convolutions of heating element 4. Thus it will be seen that downward movement of the inner convolutions of heating element 4 is accompanied by upward movement of the outermost convolution and vice versa, so that the heating element as a whole is capable of conforming to both concave and convex cooking utensil surfaces.

Figure 6:
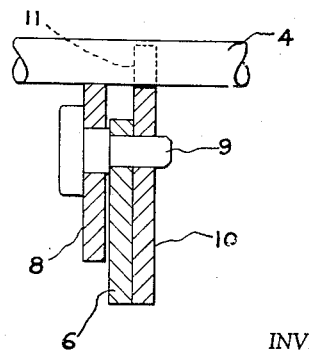
Fig. 6 is a fragmentary sectional view taken on the line 6—6 in Fig. 2.

It is of course important that heating element 4 be secured to supporting grid 5 so that the parts are held together in operative relationship without interfering with the limited flexing action described above. In accordance with the present invention this is accomplished by fixedly securing at one or more points an intermediate convolution of heating element 4 to one of the arms 6 of the grid at a point directly above the pivotal axis of one of the pivot pins 9 mounted thereon. As shown in Figs. 2 and 6, a clamping member 10 may be suitably secured, by spot welding for example to the same arm at a point adjacent pivot pin 9 and immediately below an intermediate convolution of heating element 4. Clamping member 10 includes a pair of upwardly projecting ears 11 arranged to be crimped or otherwise secured to heating element 4 so as to hold it in fixed relation with respect to supporting grid 5. Clamping only one portion of heating element 4 has proved to be satisfactory, but if a more rugged structure is desired, two or more clamping members of the type described may be utilized. It will of course be understood that if more than one clamping member is utilized it is important that the clamped portion of heating element 4 be located at a point substantially directly above the pivot axis of the adjacent rocker member, so that the clamped portions of the heating element will not interfere with pivotal movement of rocker 8. While slight vertical mis-alignment of these parts may be compensated for by cutting away the top edge of the portion of the rocker member underlying the clamped portion of the heating element, better flexibility of the surface unit may be obtained by the construction illustrated in the drawing.

Figure 3:
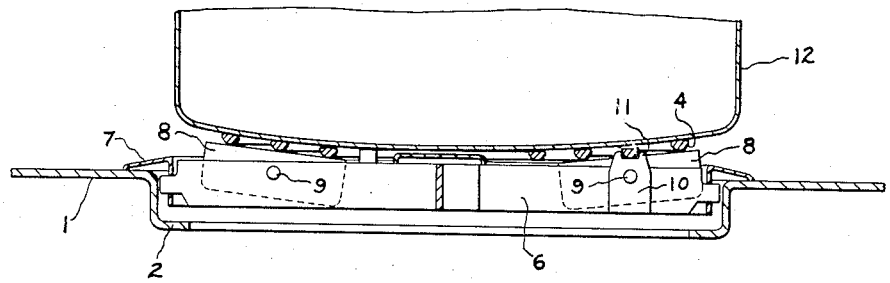
Fig. 3 is similar to Fig. 2 but shows a cooking utensil having a convex bottom surface resting on the surface cooking unit.
Figure 4:
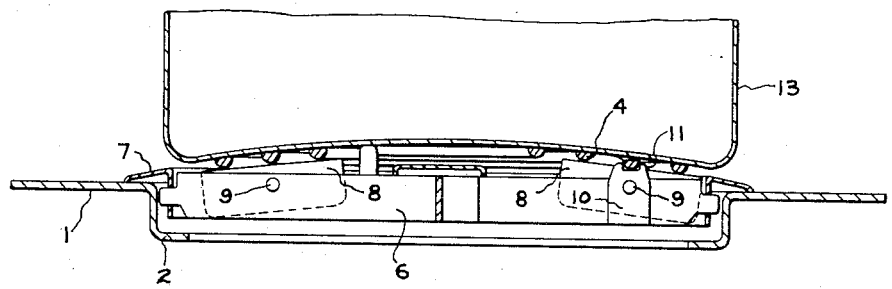
Fig. 4 is similar to Fig. 3 but shows a cooking vessel having a concave bottom surface in engagement with the cooking unit.
Figure 5:
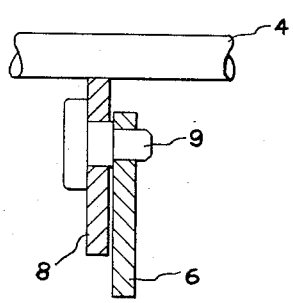
Fig. 5 is a fragmentary sectional view taken on the line 5—5 in Fig. 2.

From the foregoing description the mode of operation of my invention should be evident. As illustrated in Fig. 3, a cooking utensil 12 having a convex bottom will, when placed on heating unit 3, cause the convolutions of heating element 4 to assume a generally concave configuration and hence each of the convolutions will rest in direct contact with the utensil bottom. Similarily, as shown in Fig. 4 the convolution of heating element 4 will assume a generally convex configuration when a cooking utensil 13 having a concave bottom is placed thereon. Consequently, a reasonably constant heat transfer rate will be assured regardless of the configuration of the utensil bottom utilized in each cooking operation.

While I have shown and described a particular embodiment of my invention, I do not desire the invention to be limited to the particular construction disclosed, and I intend by the appended claims to cover all modifications within the true spirit and scope of my invention.

What I claim is:

1. An electric heating unit comprising a single continuous sheathed heating element coiled in flat spiral configuration so as to form a horizontally disposed support for cooking utensils and the like, said heating element having at least three convolutions arranged in radially spaced relationship, and means for supporting said heating element including a plurality of rocker members each mounted for pivotal movement about a horizontal axis and arranged to support radially spaced portions of at least three convolutions of said heating element, and clamping means for fixedly securing one portion of an intermediate convolution of said heating element with respect to the pivotal axis of said rocker arms.

2. An electric heating unit comprising a single continuous sheathed heating element coiled in flat spiral configuration so as to form a horizontally disposed support for cooking utensils and the like, said heating element having at least three convolutions arranged in radially spaced relationship, a supporting grid for said heating element, a plurality of rocker members each mounted on said grid for pivotal movement about a horizontal axis and arranged to support radially spaced portions of at least three convolutions of said heating element, and clamping means for fixedly securing one portion of an intermediate convolution of said heating element to said supporting grid.

3. An electric heating unit comprising a single continuous sheathed heating element coiled in flat spiral configuration so as to form a horizontally disposed support for cooking vessels and the like, said heating element having at least three convolutions arranged in radially spaced relationship, a supporting grid for said heating element, said supporting grid including a plurality of radially extending arms, a mounting ring fixedly secured to the outermost ends of said arms, a plurality of rocker members each mounted on one of said arms for pivotal movement about a horizontal axis and arranged to support radially spaced portions of at least three convolutions of said heating element, and a clamping finger fixedly secured to an intermediate convolution of said heating element at a point directly above the pivot axis of one of said rocker members, said clamping finger also being fixedly secured to said one of said rocker members.

References Cited in the file of this patent

UNITED STATES PATENTS

| | | |
|---|---|---|
| 2,288,967 | Challet | July 7, 1942 |
| 2,689,903 | Radley | Sept. 21, 1954 |

FOREIGN PATENTS

| | | |
|---|---|---|
| 208,500 | Switzerland | Apr. 16, 1940 |